(12) United States Patent
Komoda

(10) Patent No.: US 6,595,271 B2
(45) Date of Patent: Jul. 22, 2003

(54) HEAT EXCHANGER OF ALUMINUM

(75) Inventor: Shuji Komoda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/054,576

(22) Filed: Oct. 22, 2001

(65) Prior Publication Data

US 2002/0066552 A1 Jun. 6, 2002

(30) Foreign Application Priority Data

Nov. 29, 2000 (JP) ........................................ 2000-362303

(51) Int. Cl.⁷ .............................. F28F 19/06; F28F 3/00
(52) U.S. Cl. ..................... 165/133; 165/134.1; 165/167; 165/916
(58) Field of Search ................................ 165/167, 916, 165/133, 134.1, 905

(56) References Cited

U.S. PATENT DOCUMENTS

| | | | |
|---|---|---|---|
| 5,125,452 A | * 6/1992 | Yamauchi et al. | 165/133 |
| 5,165,468 A | 11/1992 | Tajima et al. | |
| 5,292,595 A | * 3/1994 | Yamauchi et al. | 165/134.1 |
| 5,720,340 A | 2/1998 | Ohara et al. | 165/133 |
| 5,744,255 A | * 4/1998 | Doko et al. | 165/134.1 |
| 6,161,615 A | 12/2000 | Brieden et al. | |
| 6,298,910 B1 | 10/2001 | Komoda et al. | 165/133 |

FOREIGN PATENT DOCUMENTS

| | | | |
|---|---|---|---|
| EP | 0 551 545 | 7/1993 | |
| JP | 4-131698 | * 5/1992 | 165/153 |
| JP | 10-185462 | 7/1998 | |

* cited by examiner

Primary Examiner—Leonard R Leo
(74) Attorney, Agent, or Firm—Harness, Dickey & Pierce, PLC

(57) ABSTRACT

A heat exchanger made of aluminum includes a plurality of first plates and a plurality of second plates stacked alternately in the direction along the thickness thereof. The first plates and the second plates each constitute a three-layer structure. A first sacrificing material layer is clad on the side surface of a first core member making up each of the first plates nearer to a cooling water path and a second sacrificing material layer is clad on the side surface of a second core member making up each of the second plates nearer to the cooling water path. A first brazing material layer is clad on the side surface of the first core member nearer to an oil path, and a second brazing material layer is clad on the side surface of the second core member nearer to the oil path. The outer peripheral portions of the first and second plates are bent substantially into a U shape in such a manner that the first brazing material layer is interposed between the outer peripheral edge portions of the first and second plates and the adjacent second and first plates, respectively.

6 Claims, 15 Drawing Sheets

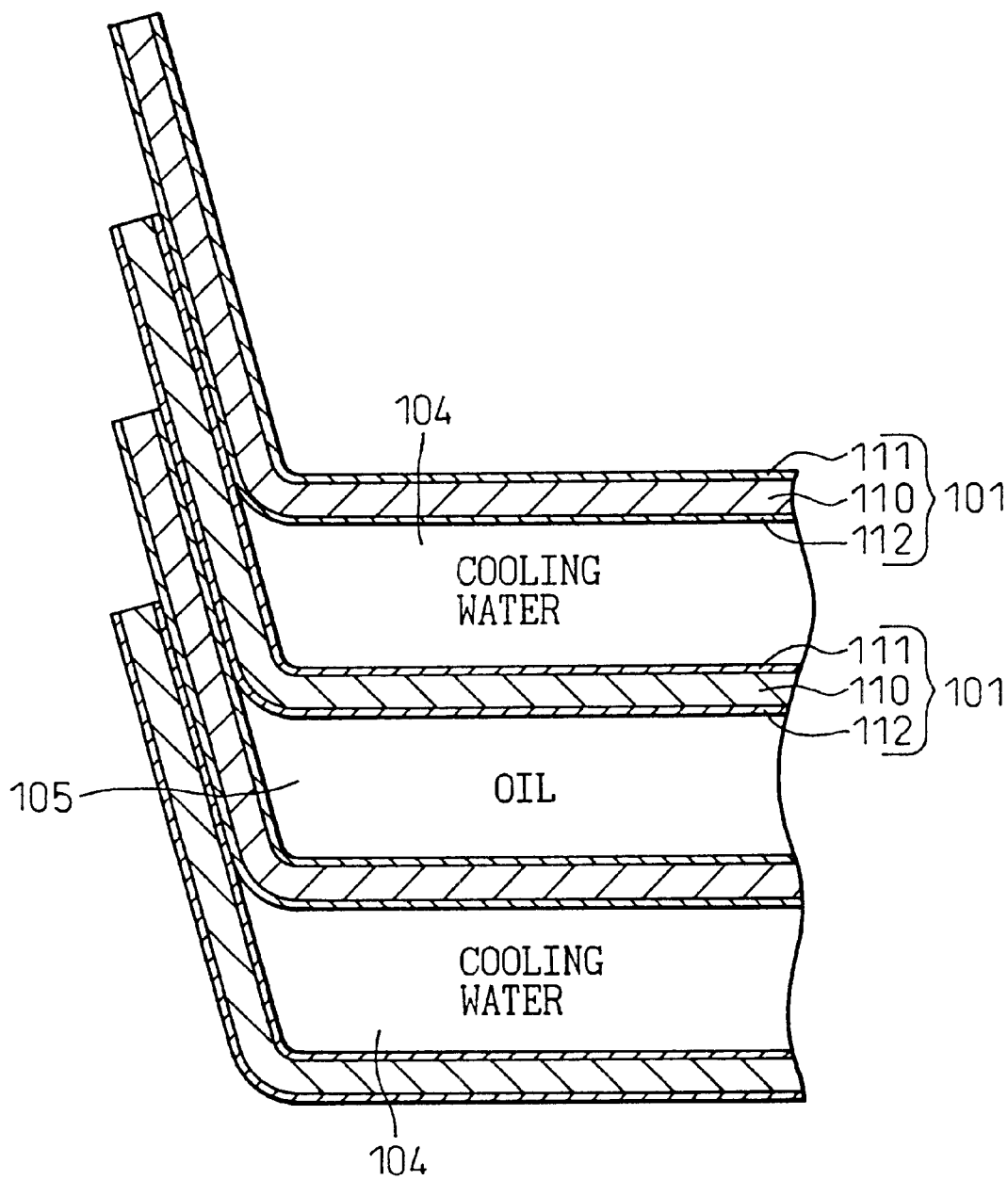

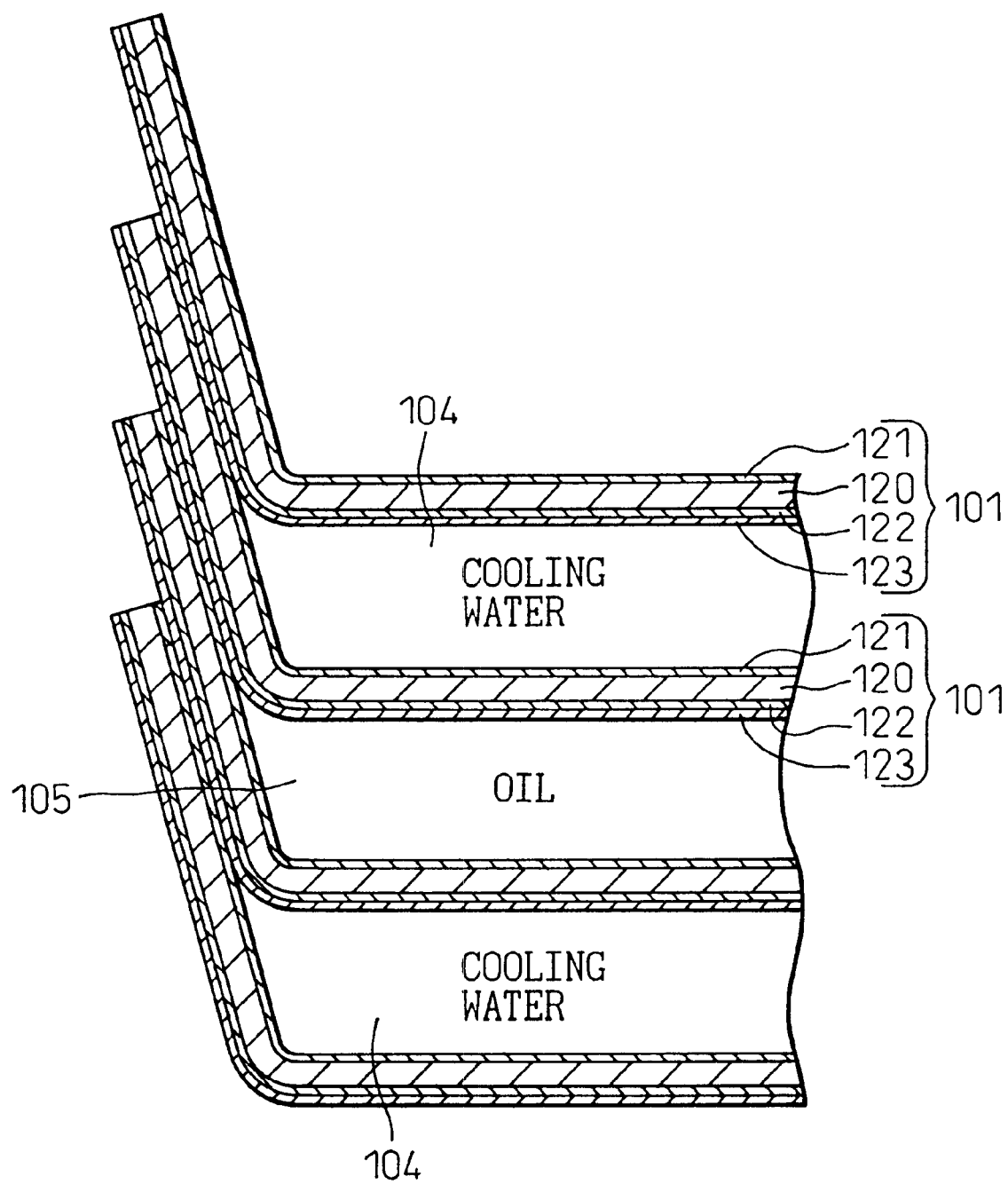

ial layer 121 is clad on one side surface of the aluminum-alloy core member 120 of the plate 101, while a second aluminum-alloy sacrificing member 122 is clad on the other side surface of the core member 120, and the surface of the second sacrificing member 122 is clad with an aluminum-alloy brazing material layer 123. The outer peripheral portion of each of these plates 101 is bent in such a manner that the surface of the brazing material layer 123 is in contact with the surface of the first sacrificing material layer 121 of an adjacent plate 101. With this structure, the presence of the brazing material in the joint of the outer peripheral portion of each plate 101 improves the coupling strength and the sealability of the joint of the outer peripheral portion of each plate 101. Nevertheless, the use of a four-layer structure for the plate 101 poses the problem of a higher material cost and the resulting higher product cost.

HEAT EXCHANGER OF ALUMINUM

BACKGROUND OF THE INVENTION

1. Field of the Invention

The present invention relates to a heat exchanger configured of a plurality of first and second plate members stacked alternately and brazed, each forming a three-layer clad aluminum-alloy structure, or in particular to a brazed structure of a housingless type oil cooler capable of preventing the corrosion of the wall of the path of the cooling water constituting a cooling medium for an oil.

2. Description of the Related Art

In a conventional housingless type oil cooler 100, as shown in FIGS. 12 and 13, a plurality of dish-shaped plates 101 having substantially the same contour are stacked and integrally brazed to each other along the arranged on the lower end of a plate stack-type core portion 102 including a plurality of the stacked plates 101. A flat cooling water path 104 is formed between some adjacent ones of the plates 101. A flat oil path 105 is formed between other adjacent ones of the plates 101. These paired structures are alternated in the direction along the thickness of the plates 101. A cooling water inlet pipe 106 and a cooling water outlet pipe 107 are mounted on the uppermost plate 101, and a packing 108 is mounted on the seat member 103. Heat transmission fins 109 are arranged in each of the oil paths 105.

Each of a plurality of the plates 101 used for this housingless oil cooler 100, as shown in FIG. 14, is an aluminum-alloy three-layer clad structure (three-layer structured plate member) formed of an aluminum-alloy core member 110 which is clad, on the two sides thereof, with first and second brazing material layers 111, 112 of an aluminum alloy such as Al—Si. The flat portions of a plurality of the plates 101 are each constructed in such a manner that the first brazing material layer 111 and the second brazing material layer 112 is arranged in opposed relation to each other with the cooling water path 104 or, as the case may be, the oil path 105 therebetween. Also, the outer peripheral portion of each of the plates 101 which is located outside of the flat portion thereof is bent so that the surfaces of the first brazing material layer 111 of a given plate 101 and the second brazing material layer 112 of an adjacent plate 101 are in contact with each other.

The conventional housingless type oil cooler 100, however, poses the problem that once the cooling water providing an oil cooling medium is degenerated and becomes corrosive, that wall of the aluminum-alloy plates 101 which is nearer to the cooling water path is easily corroded and the service life of the cooler is shortened. As a solution to this problem, an aluminum-alloy three-layer clad structure (three-layer structured plate member) has been conceived in which an aluminum-alloy sacrificing material layer is clad on that side surface of the aluminum alloy core member constituting each plate 101 which is nearer to the cooling water path and an aluminum-alloy brazing material layer is clad on the side surface of the core member nearer to the oil path. This poses another problem, however, that for lack of a brazing material in the joint between the peripheral portions of adjacent plates 101, the peripheral portions of adjacent plates 101 cannot be brazed to each other.

As a method to solve this problem, a housingless type oil cooler (Japanese Unexamined Patent Publication No. 10-185462) of an aluminum-alloy four-layer clad structure (four-layer structured plate member) has been proposed, in which as shown in FIG. 15, a first aluminum-alloy sacrific- A three-layer structured plate member with a Zn-contained brazing material layer doubling as a sacrificing member clad on the two side surfaces of the aluminum-alloy core member may be considered as still another solution. When integrally brazing this structure in a heating furnace, however, the Zn component is liable to be evaporated on the one hand and the brazing material layer is concentrated at the joint by surface tension on the other hand. Thus, the amount of the sacrificing material is difficult to control, and the resulting insufficient corrosion resistance is liable to lead to the corrosion of the wall surface of the plate member nearer to the cooling water path.

SUMMARY OF THE INVENTION

The object of the present invention is to provide a low-cost heat exchanger of aluminum comprising first and second three-layer structured plate members as first and second plates, respectively. Another object of the invention is to provide a heat exchanger of aluminum in which the coupling strength and the sealability of the joint of the peripheral portions of the first and second plate members can be improved while at the same time maintaining the corrosion resistance of the first and second plate members.

According to one aspect of the invention, there is provided a heat exchanger of aluminum comprising:

a plurality of first plates each constituting a three-layer structured first plate member including a first aluminum-alloy core member, a first sacrificing material layer clad on one side surface of the first core member and a first brazing material layer clad on the other side surface of the first core member; and a plurality of second plates each constituting a three-layer structured second plate member including a second aluminum-alloy core member, a second brazing material layer clad on one side surface of the second core member and a second sacrificing material layer clad on the other side surface of the second core member. As a result, the material cost of the heat exchanger of aluminum can be reduced for a lower product cost.

A plurality of the first plate members and the second plate members are arranged alternately in the direction along the thickness thereof in such a manner that the first sacrificing material layer and the second sacrificing material layer are in opposed relation to each other with a first fluid path therebetween while the first brazing material layer and the second brazing material layer are in opposed relation to each other with a second fluid path therebetween. This assembly is heated to higher than the melting points of the first and second brazing material layers in a heating furnace or the like. In this way, each joint between the first and second plates can be positively brazed to couple them to each other while holding the first and second sacrificing material layers on the side of each of the first and second plates exposed to the corrosive environment.

The outer peripheral edge portion of each first plate member is deformed in such a manner that at least the first brazing material layer is interposed in the joint between the outer peripheral portion of the first plate member and the second plate member or the first plate member. This assembly is heated to higher than the melting points of the first and second brazing material layers in a heating furnace or the like. As a result, the joint between the outer peripheral portion of the first plate member and the second plate member or the first plate member can be positively brazed and coupled to each other while holding the first and second sacrificing material layers on the side of each of the first and second plates exposed to the corrosive environment.

Further, the first plate member has a flat defining portion for defining the first fluid path and the second fluid path. Also, the outer peripheral portion of the first plate member includes a vertical wall portion bent in the direction along the thickness orthogonal to the direction along the surface of the defining portion from the outer peripheral end of the defining portion, and an outer peripheral edge portion bent in the direction along the surface of the defining portion from the forward end of the vertical wall portion. The outer peripheral edge portion is arranged in such a manner that the surface thereof is in contact with the surface of the second plate member through the first brazing material layer. In this way, the surfaces of the outer peripheral portion of the first plate member and the second plate member or the first plate member can be brazed to each other thereby minimizing the insufficiently brazed portions.

According to another aspect of the invention, there is provided a heat exchanger of aluminum, wherein the outer peripheral portion of each of the first plate members is deformed to have a section in the substantial shape of a U, V or C. As a result, even in the case where the first and second plate members are alternately stacked in the direction along the thickness thereof in such a manner that the first sacrificing material layer and the second sacrificing material layer are in opposed relation to each other with the first fluid path therebetween, the joint between the outer peripheral portion of the first plate member and the second plate member or the first plate member can be positively brazed.

According to still another aspect of the invention, there is provided a heat exchanger of aluminum, wherein the second plate member is bent to have a stepped surface. The outer peripheral portion of the second plate member is bent to have a section in the substantial shape of L, and between the extension portion and the outer peripheral edge portion of the second plate member, a second bent portion is formed for engaging the first bent portion between the defining portion and the vertical wall portion of the first plate member. As a result, the first plate member and the second plate member can be readily set in position with each other.

According to yet another aspect of the invention, there is provided a heat exchanger of aluminum, wherein a first fluid path through which a corrosive fluid (first fluid) flows is formed between the second sacrificing material layer side surface of the second plate member and the first sacrificing material layer side surface of the first plate member. Also, a second fluid path through which a non-corrosive fluid (second fluid) flows is formed between the first brazing material layer side surface of the first plate member and the second brazing material layer side surface of the second plate member. The wall of the first fluid path is exposed to a more corrosive environment than the wall of the second fluid path.

According to a further aspect of the invention, there is provided a heat exchanger of aluminum, which is preferably a housingless type heat exchanger with at least a part of the outer peripheral portion of the first plate member forming an outer wall portion.

The present invention may be more fully understood from the description of the preferred embodiments of the invention set forth below together with the accompanying drawings.

BRIEF DESCRIPTION OF THE DRAWINGS

FIG. 14 is a sectional view showing the main structure of a housingless type oil cooler according to the prior art.

FIG. 15 is a sectional view showing the main structure of a housingless type oil cooler according to the prior art.

DESCRIPTION OF THE PREFERRED EMBODIMENTS (Configuration of first embodiment)

Figure 1:
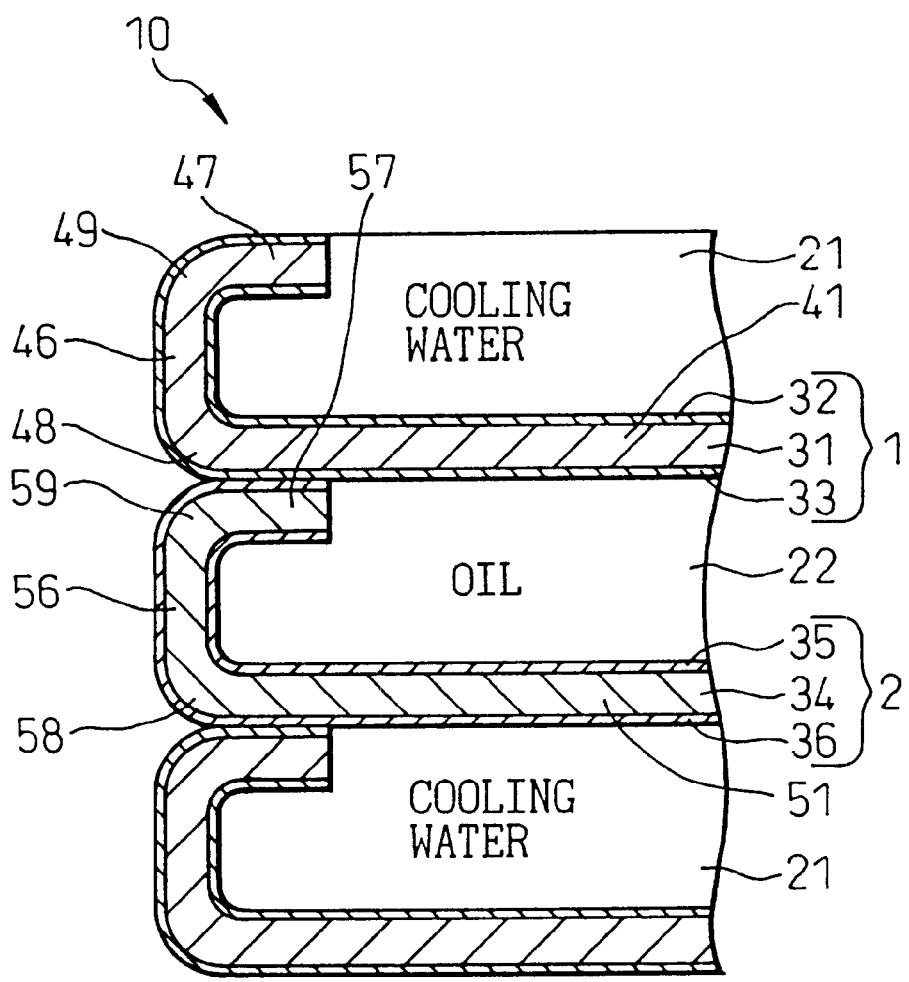
FIG. 1 is a sectional view showing the joints of the outer peripheral portions of the first and second plate members yet to be brazed, according to a first embodiment of the invention.
Figure 2A:
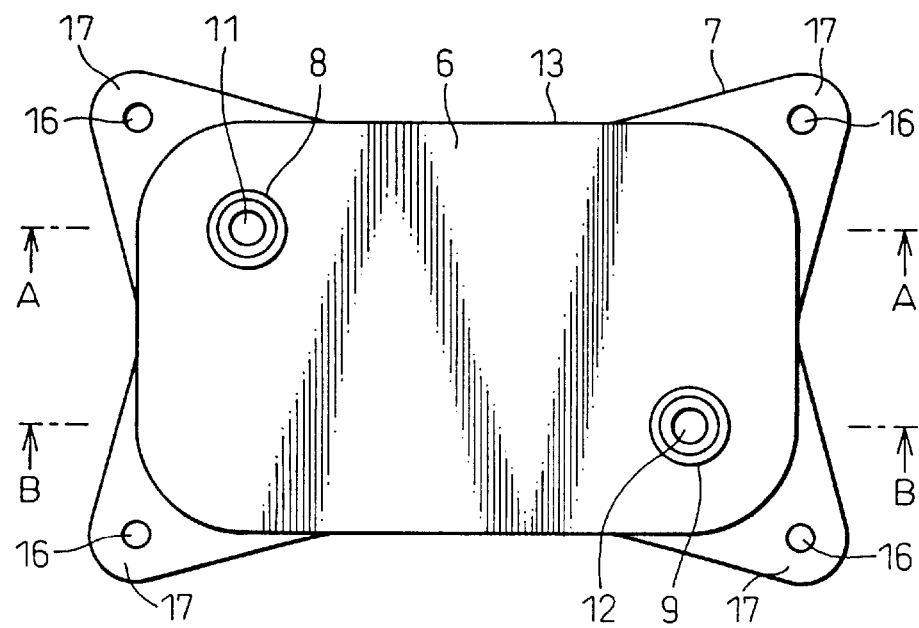
FIGS. 2A and 2B are a top plan view and a bottom view, respectively, showing a housingless type oil cooler according to the first embodiment embodiment of the invention.
Figure 2B:
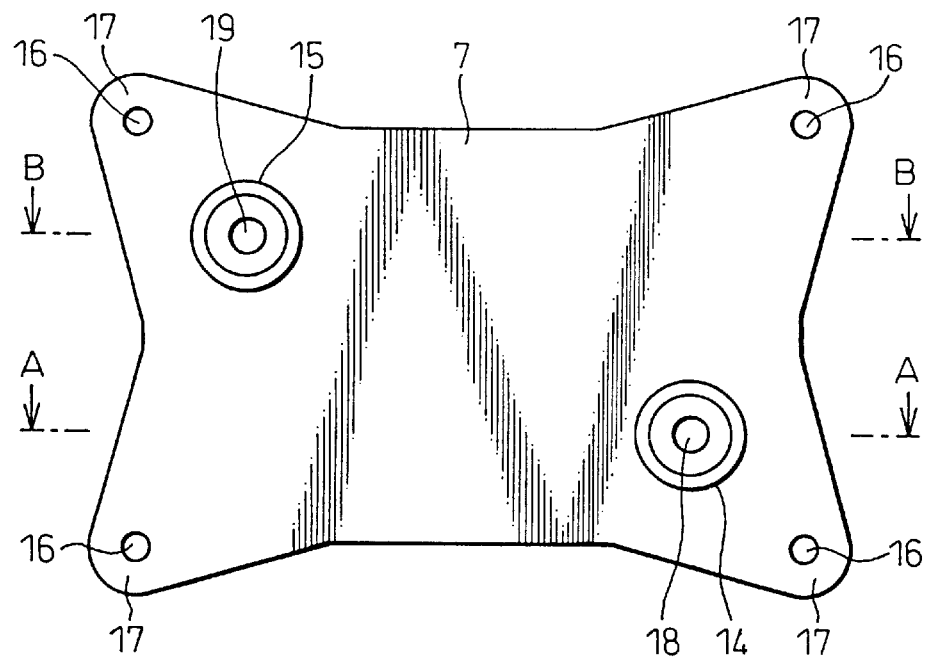
Figure 3:
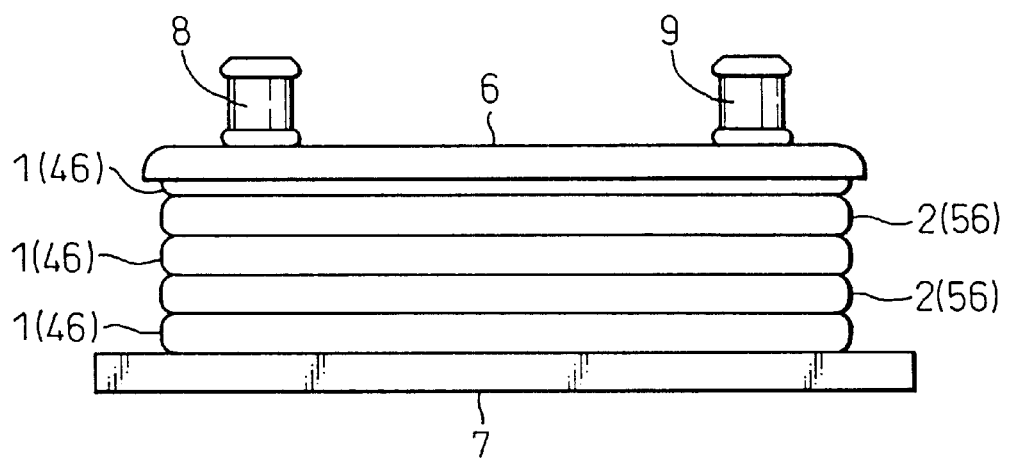
FIG. 3 is a side view showing a housingless type oil cooler according to the first embodiment embodiment of the invention.

A first embodiment of the present invention is shown in FIGS. 1 to 6B, in which FIG. 1 shows the joint between the outer peripheral portions of the first and second plate members before being brazed, and FIGS. 2A to 6 are diagrams showing a housingless type oil cooler.

A housingless type oil cooler according to this embodiment is mounted on the wall surface of a cylinder block (not shown) of an internal combustion engine of an automotive vehicle, and constitutes a heat exchanger of aluminum for exchanging heat between the cooling water for cooling the engine and the engine oil (hereinafter referred to as the oil) for lubricating the sliding portions of the engine thereby to cool the oil.

The housingless type oil cooler comprises a plate stack-type core portion (stack member) 10 for exchanging heat between the oil and the cooling water. The plate stack-type core portion 10 includes a plurality of first plates 1 and second plates 2 formed in press into a predetermined uneven shape and stacked alternately in the direction along the thickness thereof. An aluminum-alloy cover plate (ceiling plate) 6 is mounted on the uppermost surface of the plate stack-type core portion 10, and an aluminum-alloy seal member (bottom plate or pedestal) 7 is mounted on the lowermost surface of the plate stack-type core portion 10.

The cover plate 6 is a double-layer structured plate member (aluminum-alloy double-layer clad member) in which the inner side surface of an aluminum-alloy core member (the side surface nearer to the cooling water path 21) is clad with a sacrificing material layer having an inferior potential than the core member. The cover plate 6 is coupled by brazing with a straight cooling water inlet pipe 8 having a circular section formed with an inlet 11 for allowing the cooling water to flow in and a straight cooling water outlet pipe 9 having a circular section formed with an outlet 12 for the cooling water to flow out. The cover plate 6 is also formed with a bent portion 13 for engaging the first plate 1. Also, the surface of the seal member 7 far from the plate stack-type core portion 10 (that surface of the seal member 7 which is in contact with the wall surface of the cylinder block) has mounted thereon packings 14, 15 of acrylic rubber for hermetically sealing the gap between the particular surface (hereinafter referred to as the seal surface) and the wall surface of the cylinder block.

Stays 17 each with a bolt hole 16 for fixedly fastening the seal member 7 on the wall surface of the cylinder block using a fastening means (not shown) such as bolts are formed at the four corners of the seal member 7. Also, the seal member 7 is formed with a round oil inlet hole 18 for allowing the oil to flow into the plate stack-type core portion 10 and a round oil outlet hole 19 for the oil to flow out of the plate stack-type core portion 10.

The plate stack-type core portion 10 includes a plurality of substantially rectangular, substantially circular or substantially elliptic first plates 1 and a plurality of substantially rectangular, substantially circular or substantially elliptic second plates 2 stacked alternately in the direction along the thickness thereof. In this way, a flat cooling water path (corresponding to a first fluid path according to the invention) 21 in which the cooling water flows, is formed between the second sacrificing material layer side surface of the second plate 2 and the first sacrificing material layer side surface of the first plate 1, while a flat oil path (corresponding to a second fluid path according to the invention) in which the oil flows, is formed between the first brazing material layer side surface of the first plate 1 and the second brazing material layer side surface of the second plate 2 adjacent thereto. Thus, each of the second plates 2 and the immediately lower first plate 1 make up a cooling water path, while each of the first plates 1 and the immediately lower second plate 2 constitute an oil path.

Inner fins (offset fins) 23 for improving the efficiency of heat exchange between the oil and the cooling water are arranged in each oil path 22. A plurality of the cooling water paths 21, which are stacked in the direction along the thickness of the second plate 2 and the first plate 1, have cooling water communication paths 24, 25 for communication between the flow inlet and the flow outlet of each cooling water path 21. A plurality of the oil paths 22, on the other hand, which are stacked in the direction along the thickness of the first plate 1 and the second plate 2, have oil communication paths 26, 27 for communication between the inlet and the outlet of each oil path 22.

The first plate 1 is a three-layer structured first plate member (aluminum-alloy three-layer clad structure) including, as shown in FIG. 1, a first aluminum-alloy core member (base metal) 31 having one side surface (the side surface nearer to the cooling water path 21) clad with a first sacrificing material layer 32 having a potential inferior to the first core member 31; and a first brazing material layer 33 clad on the other side surface (the side surface nearer to the oil path) of the first core member and having a lower melting point than the first core member 31. The first sacrificing material layer 32 is a first sacrificing corrodible material layer having a higher melting point than the first brazing material layer 33 and a lower corrosion resistant than the first core member 31 to assure earlier corrosion than the first core member 31.

Each first plate (first plate member) has a flat defining portion 41 for defining the cooling water path 21 and the oil path 22. Each defining portion 41 includes an annular inner peripheral edge portion (joint) 42 for forming a cooling water communication path 24, an annular inner peripheral edge portion (joint) 43 for forming a cooling water communication path 25, an annular protruded portion (joint) 44 for forming an oil communication path 26 and an annular protruded portion (joint) 45 for forming an oil communication path 27.

The outer peripheral portion of the first plate member located on the outer peripheral side than the defining portion 41 is bent (deformed) to secure a substantially U-shaped section, and includes a vertical wall portion (outer wall portion) 46 bent in the direction along the thickness orthogonal to the direction along the surface of the defining portion 41 from the outer peripheral end of the defining portion 41 and an outer peripheral edge portion (horizontal wall portion or joint) 47 bent in the direction along the surface of the defining portion 41 from the forward end of the vertical wall portion 46. A first bent portion 48 is formed between the defining portion 41 and the vertical wall portion 46, and a first bent portion 49 is formed between the vertical wall portion 46 and the outer peripheral edge portion 47. The outer peripheral edge portion 47 is arranged in such a manner that the surface thereof is in contact with the side surface of the defining portion 41 of the second plate member nearer to the cooling water path through the first brazing material layer 33 and the second sacrificing material layer 36.

The second plate 2, on the other hand, is a three-layer structured second plate member (aluminum-alloy three-layer clad structure) including, as shown in FIG. 1, a second aluminum-alloy core member (base metal) 34 having one side surface (the side surface nearer to the oil path 22) clad with a second brazing material layer 35 having a lower melting point than the second core member 34, and the other side surface (the side surface nearer to the cooling water path 21) of the second core member 34 clad with a second sacrificing material layer 36 having an inferior potential to the second core member 34. The second sacrificing material layer 36 is a second sacrificing corrodible material layer having a higher melting point than the second brazing material layer 35 and a lower corrosion resistance than the second core member 34 to assure earlier corrosion than the second core member 34.

Each second plate (second plate member) 2 has a flat defining portion 51 for defining the cooling water path 21 and the oil path 22. This defining portion 51 includes an annular protruded portion (joint) 52 for forming a cooling water communication path 24, an annular protruded portion (joint) 53 for forming a cooling water communication path 25, an annular burring portion (joint) 54 for forming an oil communication path 26, and an annular burring portion (joint) 55 for forming an oil communication path 27. The burring portions 54, 55 are bent in such a manner as to protrude in the opposite direction (downward in the drawing) to the protrusion direction of the protruded portions 52, 53.

The outer peripheral portion of the second plate member located on the outer peripheral side of the defining portion 51 is bent (deformed) to secure a substantially U-shaped section, and includes a vertical wall portion (outer wall portion) 56 bent in the direction along the thickness orthogonal to the direction along the surface of the defining portion 51 from the outer peripheral end of the defining portion 51 and an outer peripheral edge portion (joint) 57 bent in the direction along the surface of the defining portion 51 from the forward end of the vertical wall portion 56. A second bent portion 58 is formed between the defining portion 51 and the vertical wall portion 56, and a second bent portion 59 is formed between the vertical wall portion 56 and the outer peripheral edge portion 57. The outer peripheral edge portion 57 is arranged in such a manner that the surface thereof is in contact with the surface of the defining portion 41 of the first plate member nearer to the oil path through the second sacrificing material layer 36 and the first brazing material layer 33.

(Brazing method according to first embodiment)

Now, a method for brazing a housingless type oil cooler according to this embodiment will be explained briefly with reference to FIGS. 1 to 6B.

First, a first brazing member is clad on one side surface of the first core member 31, and a first sacrificing corrodible member is clad on the other side surface of the first core member 31. The first plate 1 with a first brazing material layer 33 formed on the one surface of the first core member 31 and the first sacrificing material layer 32 formed on the other side surface of the first core member 31 is machined in press (bent, for example) thereby to obtain a product in a predetermined shape. Also, a second sacrificing corrodible material member is clad on one side surface of the second core member 34, and a second brazing material member is clad on the other side surface of the second core member 34. The second plate 2 with a second sacrificing material layer 36 formed on the one surface of the second core member 34 and the second brazing material layer 35 formed on the other side surface of the second core member 34 is machined and pressed (bent, for example) to thereby obtain a product in a predetermined shape.

The first and second core members 31, 34 are formed of an Al—Mn aluminum alloy plate (for example, A3000 or A3003: aluminum-manganese alloy plate) for reducing the weight and increasing the heat transmission. The first and second brazing layers 33, 35, on the other hand, are often composed of an Al—Si aluminum alloy brazing material (such as A3104: aluminum-silicon alloy) or an Al—Si—Mg aluminum-alloy brazing material. The first and second sacrificing material layers 32, 36, on the other hand, are comprised of an Al—Zn aluminum alloy (such as A7072: aluminum-zinc alloy). Incidentally, the term "clad" is defined as a well-known process in which the thin films of the aluminum-alloy brazing material forming the first and second brazing material layers 33, 35 and the thin aluminum-alloy films forming the first and second sacrificing material layers 32, 36 are heated at a temperature lower than the melting points thereof while at the same time being pressed against the base metal comprised of the first and second core members 31, 34 and thereby fixedly attached on the surfaces of the first and second core members 31, 34.

Figure 4:
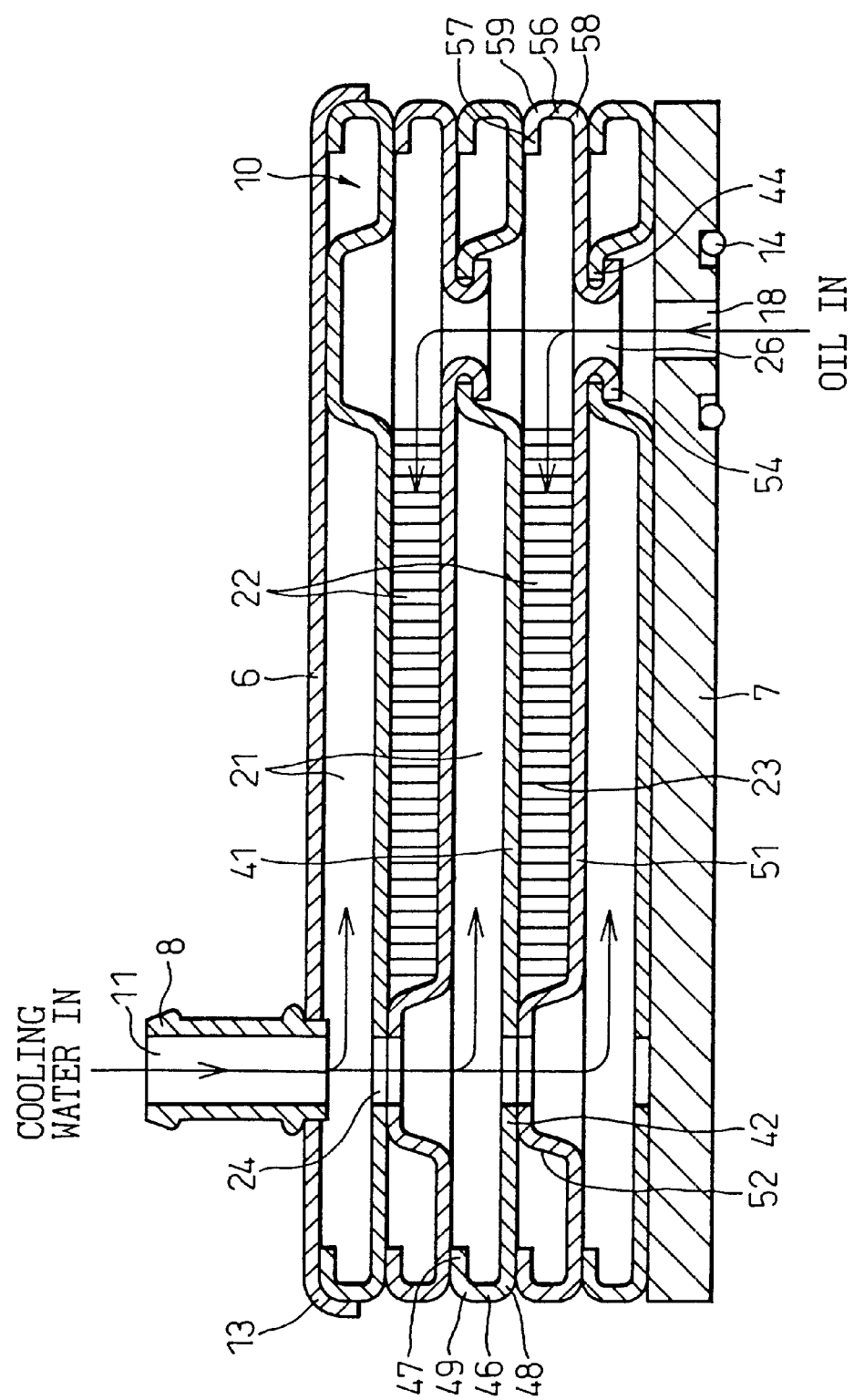
FIG. 4 is a sectional view taken along line A—A in FIGS. 2A, 2B according to the first embodiment embodiment of the invention.
Figure 5:
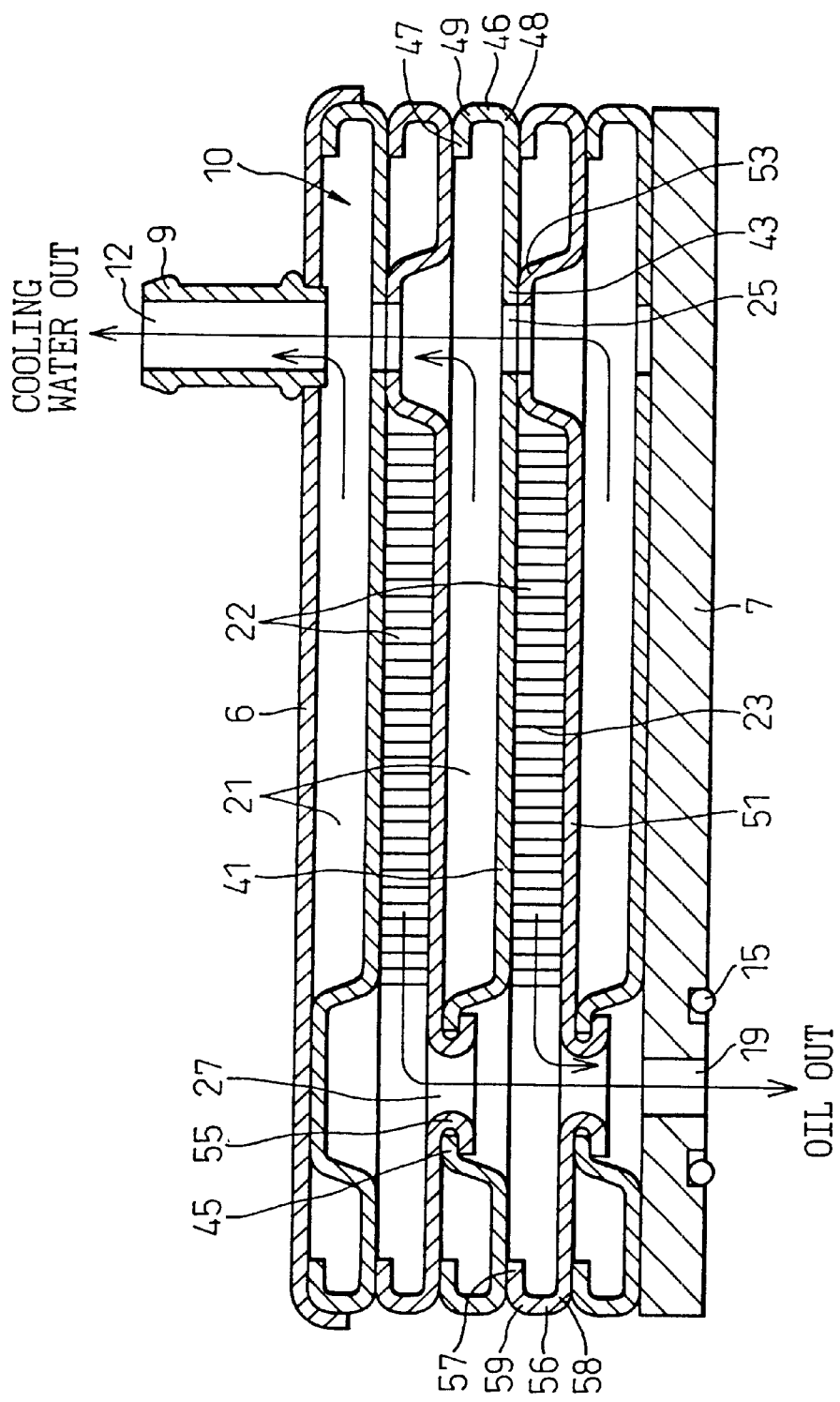
FIG. 5 is a sectional view taken along line B—B in FIGS. 2A, 2B according to the first embodiment embodiment of the invention.

As shown in FIGS. 4 and 5, with the inner fins 23 held between each pair of the first and second plate members, the first and second plate members are stacked alternately in the direction along the thickness thereof in such a manner that the first brazing material layer 33 side surface of the inner peripheral edge portions 42, 43 of the first plate member and the second brazing material layer 35 side surface of the protruded portions 52, 53 of the second plate member are in close contact with each other. Then, the burring portions 54, 55 of the second plate member are deformed (bent) so that the second brazing material layer 35 side surface of the burring portions 54, 55 and the first sacrificing material layer 32 side surface of the protruded portions 44, 45 of the first plate member are in close contact with each other (the joint between the inner peripheral edge portions of the first and second plates 1, 2).

As shown in FIGS. 1, 4 and 5, on the other hand, the first brazing material layer 33 side surface of the outer peripheral edge portion 47 formed by bending the outer peripheral portion of the first plate member into the substantial shape of U and the second sacrificing material layer 36 side surface of the outer peripheral end of the defining portion 51 of the second plate member are brought into close contact with each other, while the second sacrificing material layer 36 side surface of the outer peripheral edge portion 57 formed by bending the outer peripheral portion of the second plate member into the substantial shape of U and the first brazing material layer 33 side surface of the outer peripheral end of the defining portion 41 of the first plate member are brought into close contact with each other (the joint between the outer peripheral edge portions of the first plate 1 and the second plate 2). A plurality of the first plates 1 and the second plates 2 formed into the shape of a product as described above are stacked alternately with each other in the direction along the thickness thereof thereby to produce a plate stack-type core portion 10 yet to be brazed. A seal member 7 is provisionally assembled on the bottom side surface of the plate stack-type core portion 10 yet to be brazed, while a cover plate 6 with a cooling water inlet pipe 8 and a cooling water outlet pipe 9 mounted thereon is provisionally assembled on the upper side surface of the plate stack-type core portion 10 yet to be brazed. In the process, the inner side surface of the bent portion 13 constituting the outer peripheral edge portion of the cover plate 6 is fitted in position on the first bent portion 49 between the vertical wall portion 46 and the outer peripheral edge portion 47 of the first plate 1.

As the next step, a stack-type assembly including the plate stack-type core portion 10 with the cover plate 6 and the seal member 7 assembled thereon is placed in a heating furnace such as a vacuum furnace and integrally brazed at a brazing temperature not lower than the melting points of the first and second brazing material layers 33, 35 but lower than the melting points of the first and second sacrificing material layers 32, 36. A flux may be used for improving the brazing characteristic on the joint surface between the first plate 1 and the second plate 2. At the same time, especially in the plate stack-type core portion 10, the first brazing material flows from the first brazing material layer 33 and the second brazing material layer 35, by the surface tension, into the joints of the inner peripheral edge portions and the outer peripheral edge portions of the first plate 1 and the second plate 2.

As a result, the joints of the inner peripheral edge portion and the outer peripheral edge portion of the first plate 1 and the second plate 2 are positively brazed and coupled to each other. Specifically, the first brazing material layer 33 side surface of the first plate 1 and the second sacrificing material layer 36 side surface of the second plate 2 are brazed and coupled to each other positively, while the second brazing material layer 35 side surface of the second plate 2 and the first brazing material layer 33 side surface of the first plate 1 are brazed and coupled to each other positively. During the integral brazing process, the first brazing material from the first brazing material layer flows also by circumvention between the first sacrificing material layer 32 side surface of the first plate 1 and the second sacrificing material layer 36 side surface of the second plate 2. The first brazing material that has thus circumvented is mixed with the first and second sacrificing materials of the first sacrificing material layer 32 and the second sacrificing material layer 36, respectively, and assumes a higher potential than the original potential of the first and second sacrificing materials of the first sacrificing material layer 32 and the second sacrificing material layer 36. In this way, the first brazing material can be prevented from being corroded earlier.

(Operation of first embodiment)

Now, the operation of the housingless type oil cooler according to this embodiment will be briefly explained with reference to FIGS. 1 to 6B.

Figure 6A:
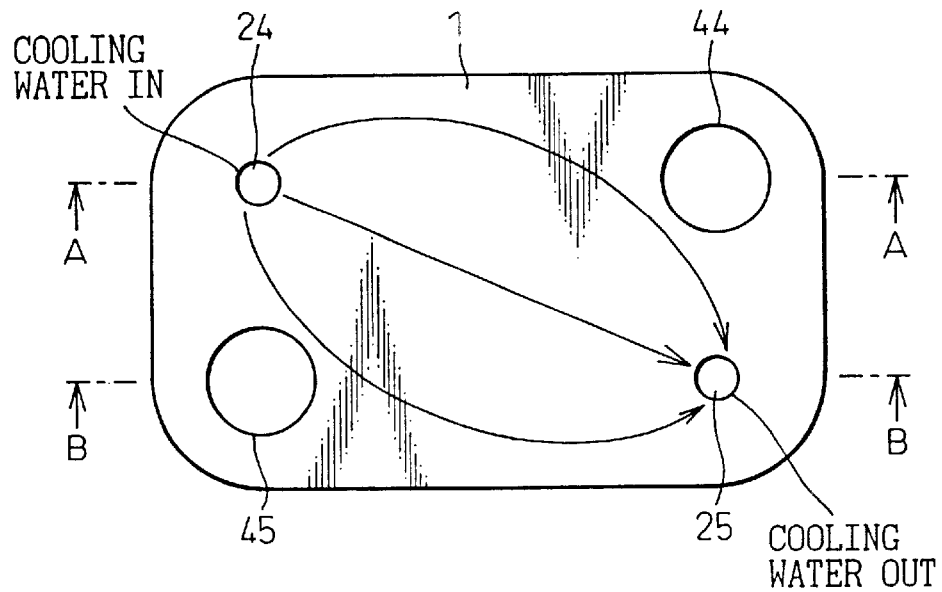
FIG. 6A is a model diagram showing the flow along the surface of the cooling water path, and FIG. 6B a model diagram showing the flow along the surface of the oil path.
Figure 6B:
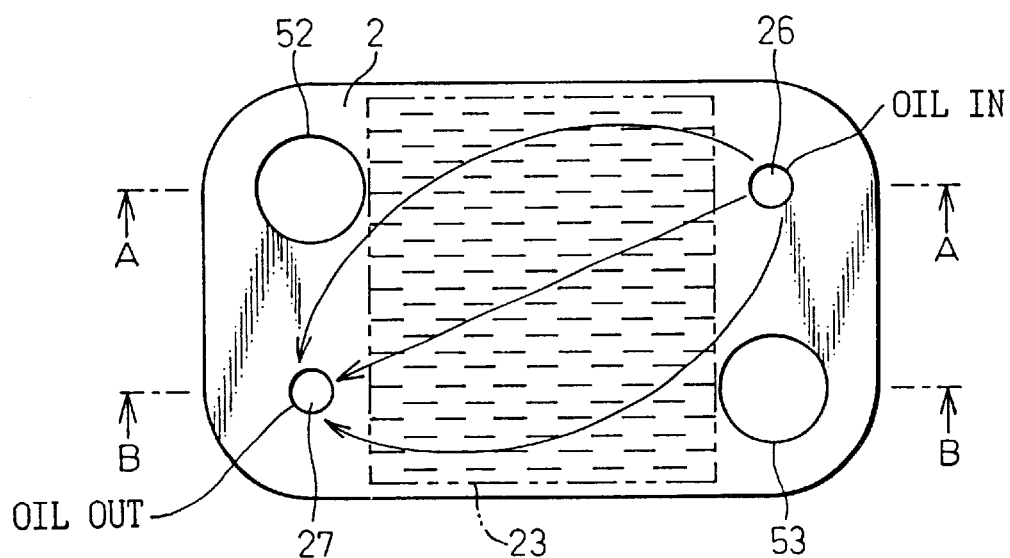

The oil for lubricating the sliding parts of the engine flows into the oil communication path 26 of the plate stack-type core portion 10 from the oil inlet 18 of the seal member 7 through an oil path (not shown) formed in the cylinder block of the engine. The oil that has flowed into the oil communication path 26, as indicated by arrows in FIG. 4, flows distributively into a plurality of flat oil paths 22 having the inner fins 23. The oil that has flowed distributively into a plurality of the oil paths 22, as indicated by arrows in FIG. 6B, is cooled by exchanging heat with the cooling water flowing outside the first plate 1 and the second plate 2 as it passes through a plurality of the oil paths 22, and then flows into the oil communication path 27, as indicated by arrows in FIG. 5. The oil that has flowed into the oil communication path 27 is returned from the oil outlet 19 of the seal member 7 into an oil passage (not shown) formed in the cylinder block.

On the other hand, the engine cooling water flows into the cooling water communication paths 24 of the plate stack-type core portion 10 through the inlet 11 of the cooling water inlet pipe 8 from a cooling water pipe (not shown). The cooling water that has flowed into the cooling water communication paths 24, as indicated by arrows in FIG. 4, flows distributively into a plurality of flat cooling water paths 21. The cooling water that has flowed distributively into a plurality of the cooling water paths 21, as indicated by arrows in FIG. 6A, cools the oil by exchanging heat with the oil flowing outside the first plate 1 and the second plate 2 as it passes through a plurality of the cooling water paths 21. At the same time, the cooling water is heated while flowing into the cooling water communication paths 25 as indicated by arrows in FIG. 5. The cooling water that has flowed into the cooling water communication paths 25 is returned into the cooling water pipe (not shown) through the outlet 12 of the cooling water outlet pipe 9.

(Effects of first embodiment)

As described above, the plate stack-type core portion 10 of the housingless type oil cooler according to this embodiment is configured of the three-layer structured first plate member making up the first plate 1 including the first core member 31, the first brazing material layer 33 and the first sacrificing material layer 32 on the one hand, and the three-layer structured second plate member making up the second plate 2 including the second core member 34, the second brazing material layer 35 and the second sacrificing material layer 36 on the other hand. Even in this case, the plate stack-type core portion 10 can be integrally brazed at the joint between the outer peripheral edge portions and the inner peripheral edge portions of the first plate 1 and the second plate 2 making up the first plate member and the second plate member, respectively, by the interposition of at least the first brazing material layer 33 between the first plate 1 and the second plate 2.

As a result, with the first and second sacrificing material layers 32, 36 maintained on the side of the first and second plates 1, 2 exposed to the corrosive environment, the joint of the outer peripheral portion and the inner peripheral portion of the first and second plates 1, 2, i.e. the first brazing material layer 33 side surface of the first plate 1 and the second sacrificing material layer 36 side surface of the second plate 2 can be brazed positively to each other, while at the same time making it possible to positively braze the first brazing material layer 33 side surface of the first plate 1 and the second brazing material layer 35 side surface of the second plate 2 to each other. Thus, with the corrosion resistance of the first and second plates 1, 2 of an aluminum alloy maintained, the brazing characteristic of the first and second plates 1, 2 at the joint thereof can be improved. In this way, the service life of the housingless type oil cooler products can be lengthened on the one hand, and the hermeticity and the coupling strength at the joint of the first and second plates 2 can be improved at the same time.

Also, with the plate stack-type core portion 10 of the housingless type oil cooler, even in the case where the highly corrosive, degenerated cooling water flows in the cooling water path 21, the first and second sacrificing material layers 32, 36 are corroded earlier than the first and second core members 31, 34, respectively, thereby making it difficult to corrode the first and second core members 31, 34 of the first and second plates 1, 2. In this way, the corrosion of the first and second plates 1, 2 (first and second core members 31, 34) in the direction along the thickness thereof can be effectively prevented. In other words, the corrosion is made to progress in the direction along the surface of the first and second plates 1, 2 for an improved corrosion resistance. As a result, with no communication (without any hole being formed) established between the cooling water path 21 and the oil path 22, the inconvenience of oil and water mixing each other can be prevented and so can the leakage of the cooling water. Thus, the service life of the housingless type oil cooler products can be lengthened.

(Second embodiment)

Figure 7:
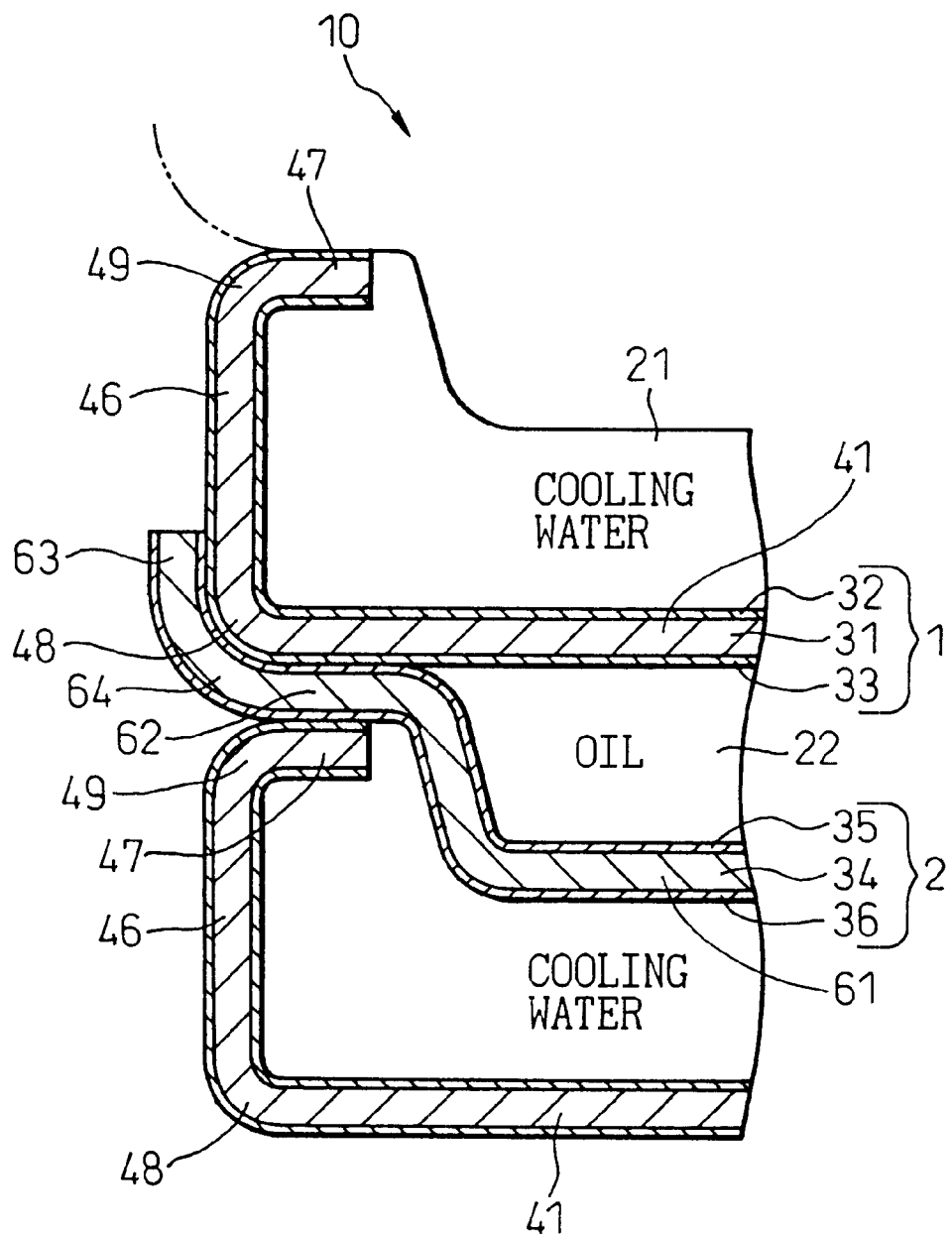
FIG. 7 is a sectional view showing the joint between the outer peripheral portions of the first and second plates yet to be brazed according to a second embodiment of the invention.
Figure 8:
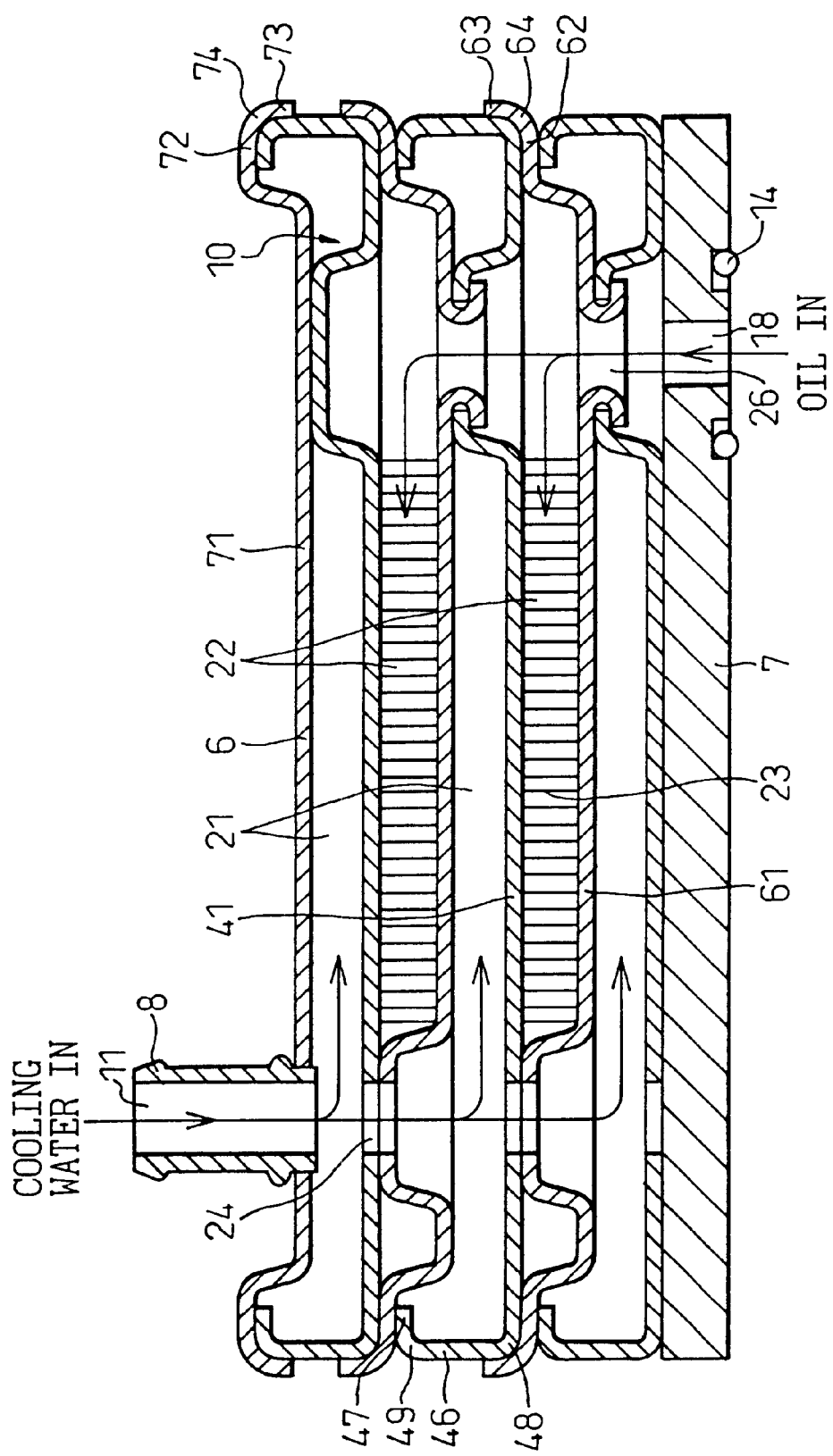
FIG. 8 is a sectional view taken along line A—A in FIGS. 2A, 2B according to the second embodiment of the invention.
Figure 9:
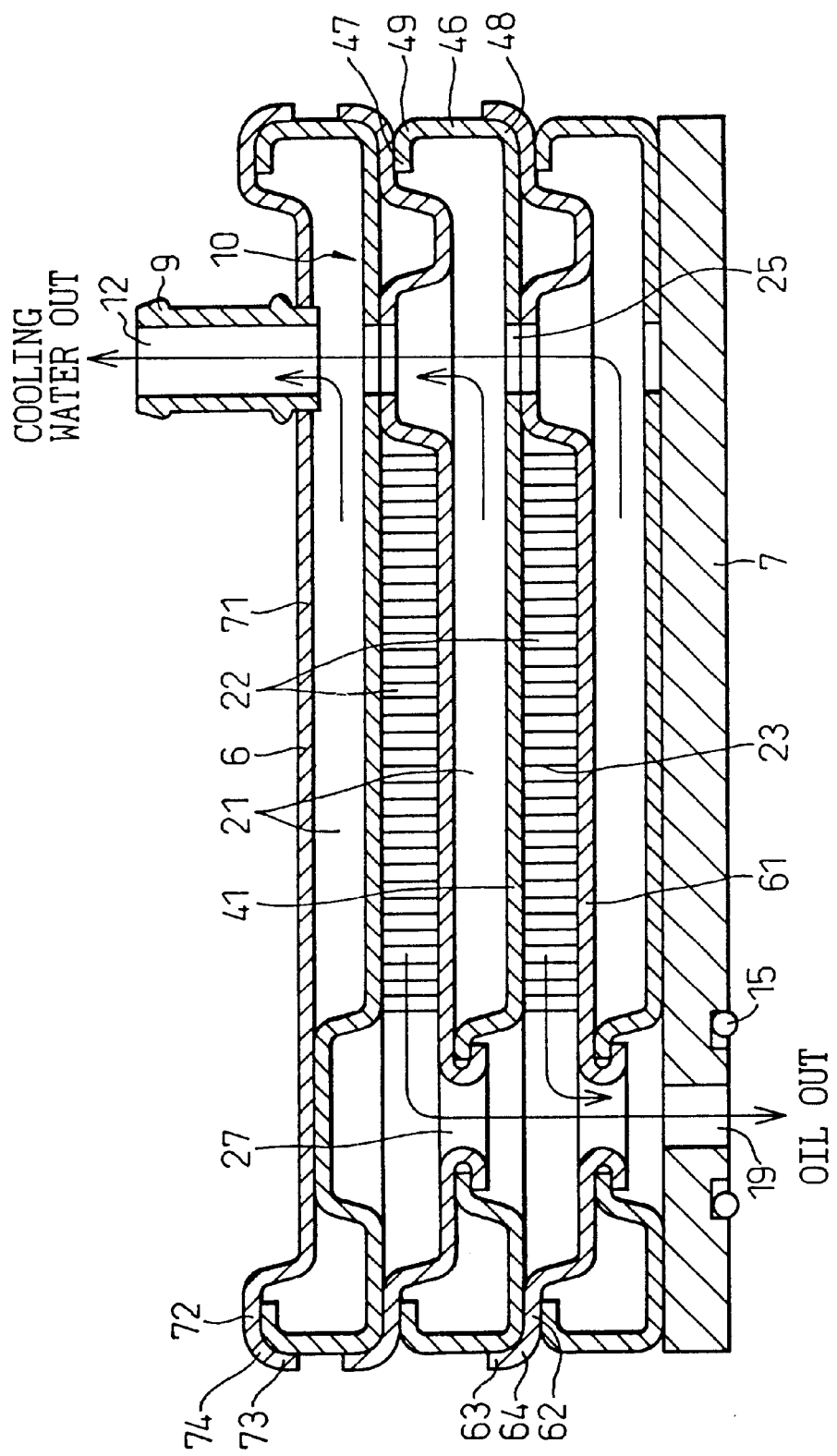
FIG. 9 is a sectional view taken along line B—B in FIGS. 2A, 2B according to the second embodiment of the invention.

FIGS. 7 to 9 show a second embodiment of the invention, in which FIG. 7 is a diagram showing the joint between the outer peripheral portions of the first and second plate members before being brazed, and FIGS. 8 and 9 are diagrams showing a housingless type oil cooler.

This embodiment, in which each second plate (second plate member) 2 and the cover plate 6 are bent in such a manner as to form a stepped surface, includes defining portions 61 and a ceiling portion 71 each having a stepped surface for defining the cooling water path 21 and the oil path 22. The defining portions 61 and the ceiling portion 71 with a stepped surface have horizontal portions located in different planes and coupled to each other by an inclined wall.

According to this embodiment, the outer peripheral portion of the second plate (second plate member) 2 is bent (deformed) in such a manner as to produce a substantially L-shaped section. The outer peripheral portions of the second plate (second plate member) 2 and the cover plate 6 include extension portions 62, 72, respectively, extending in the direction along the surface of the defining portion 61 and the ceiling portion 71 from the outer peripheral ends of the defining portion 61 and the ceiling portion 71, respectively. These outer peripheral portions further include outer peripheral edge portions 63, 73 bent in the direction along the thickness orthogonal to the surface of the extension portions 62, 72 from the outer peripheral ends of the extension portions 62, 72, respectively. Second bent portions 64, 74 are formed between the extension portions 62, 72 and the outer peripheral edge portions 63, 73, respectively.

The side surface of the cover plate 6 nearer to the cooling water path 21, i.e. the side surface of the aluminum-alloy core member (not shown) nearer to the cooling water path 21 is clad with the second sacrificing material layer (not shown) like in the second plate member. The second sacrificing material layer 36 side surface (recessed portion) of each of the second bent portions 64, 74 engages the first bent portion 48 formed between the defining portion 41 and the vertical wall portion 46 of the first plate (first plate member) 1.

In the plate stack-type core portion 10 of the housingless type oil cooler according to this embodiment, a plurality of first and second plates are stacked alternately with each other in the direction along the thickness thereof in such a manner that the first brazing material layer 33 side surface of the outer peripheral edge portion 47 of the first plate member adjacent to a given second plate member is in close contact with the second sacrificing material layer 36 side surface of the extension portion 62 of a second plate member on the one hand, and the second brazing material layer 35 side surfaces of the extension portion 62, the second bent portion 64 and the outer peripheral edge portion 63 of the second plate member are in close contact with the first brazing material layer 33 side surfaces of the outer peripheral end of the defining portion 41, the first bent portion 48 and the vertical wall portion 46, respectively, of the other adjacent first plate member on the other hand.

According to this embodiment, the first and second plates 1, 2 are so stacked that the second sacrificing material layer 36 side surface (recessed portion) of the second bent portions 64, 74 of the second plate 2 and the cover plate 6, respectively, engages the first bent portion 48 formed between the defining portion 41 and the vertical wall portion 64 of the first plate 1. Therefore, the first plate 1 and the second plate 2 can be easily set in position relative to each other, and so can the first plate 1 and the cover plate 6.

(Third embodiment)

Figure 10:
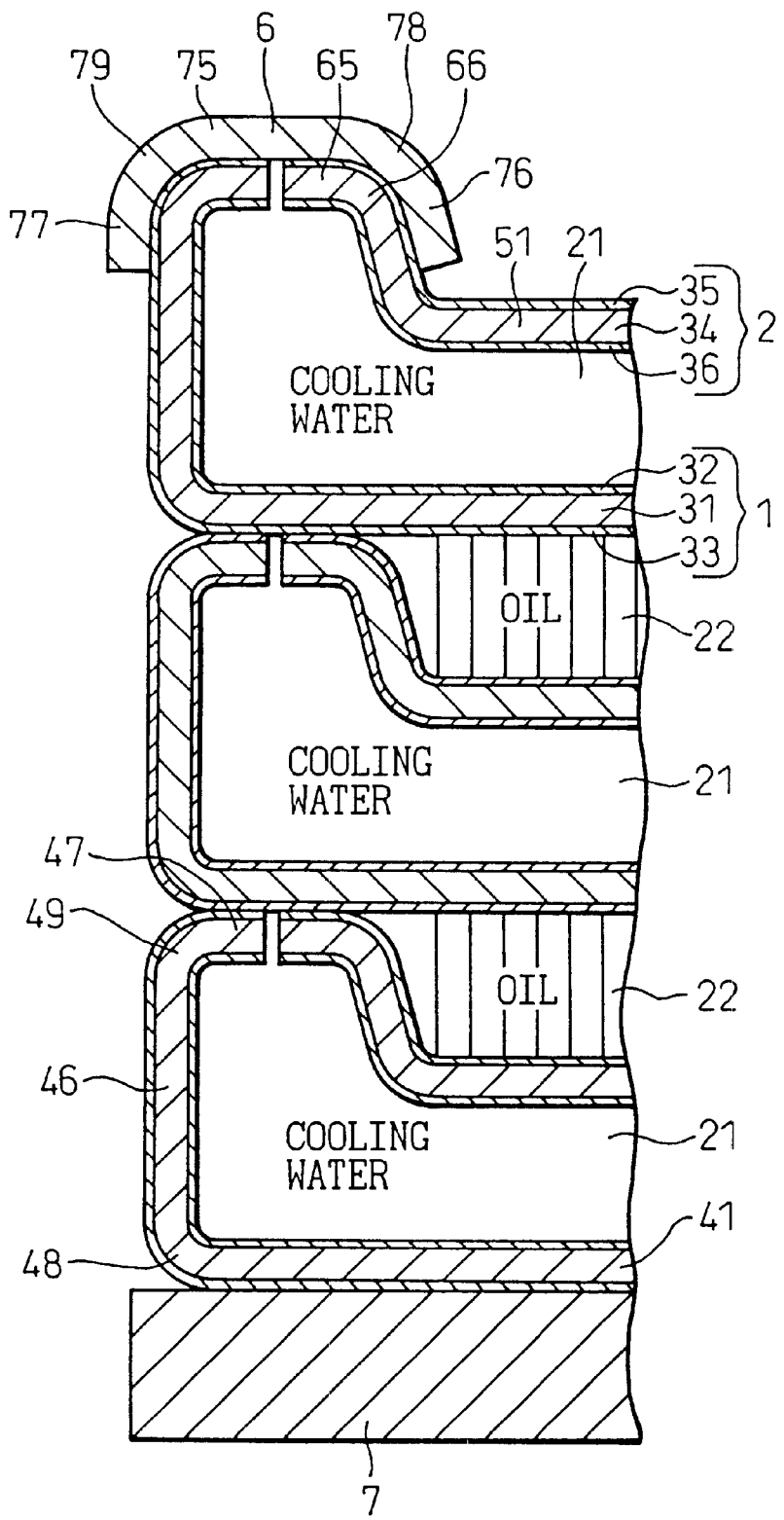
FIG. 10 is a sectional view showing the joint between the outer peripheral portions of the first and second plates yet to be brazed according to a third embodiment of the invention.

FIG. 10 shows a joint between the outer peripheral portions of the first and second plate members yet to be brazed according to a third embodiment of the invention.

According to this embodiment, once the plate stack-type core portion 10 is installed in an external corrosive environment, the surfaces of the sacrificing materials of the first and second bent portions 48, 49, 58, 59 and the vertical wall portions 46, 56 corresponding to the outer wall portions of the first and second plates (first and second plate members) 1, 2 are exposed and corroded earlier. In view of this, the shape of the plate stack-type core portion 10 shown in FIG. 10 is employed for preventing the earlier corrosion of the first and second sacrificing corrodible members in an external corrosive environment. The outer peripheral portion of the second plate 2 has the outer peripheral edge portion 65 bent in such a manner as to produce a stepped surface from the outer peripheral end of the defining portion 51. A second bent portion 66 is formed between the outer peripheral edge portion 65 and the defining portion 51.

The plate stack-type core portion 10 according to this embodiment is so configured that the first brazing material layer 33 side surface of the outer peripheral edge portion 47 of the first plate member and the first brazing material layer 33 side surface of the outer peripheral end of the defining portion 41 of the first plate member are in close contact with each other, and the second brazing material layer 35 side surface of the outer peripheral edge portion 65 of the second plate member and the first brazing material layer 33 side surface of the defining portion 41 of the first plate member are in close contact with each other.

The cover plate 6 includes a flat ceiling portion 75 coupled to the first brazing material layer 33 side surface of the outer peripheral edge portion 47 of the first plate member on the one hand and the second brazing material layer 35 side surface of the outer peripheral edge portion 65 of the second plate member on the other hand, an inner edge portion 76 extended obliquely from the inner peripheral end of the ceiling portion 75 and an outer peripheral edge portion 77 bent in the direction along the thickness orthogonal to the direction along the surface of the ceiling portion 75 from the outer peripheral end of the ceiling portion 75. A bent portion 78 is formed between the ceiling portion 75 and the inner peripheral edge portion 76, and a bent portion 79 is formed between the ceiling portion 75 and the outer peripheral edge portion 77. The inner side surfaces (recessed portions) of the bent portions 78, 79 of the cover plate 6 are formed to engage the first bent portion 49 of the first plate member and the second bent portion 66 of the second plate member, respectively.

(Fourth embodiment)

Figure 11:
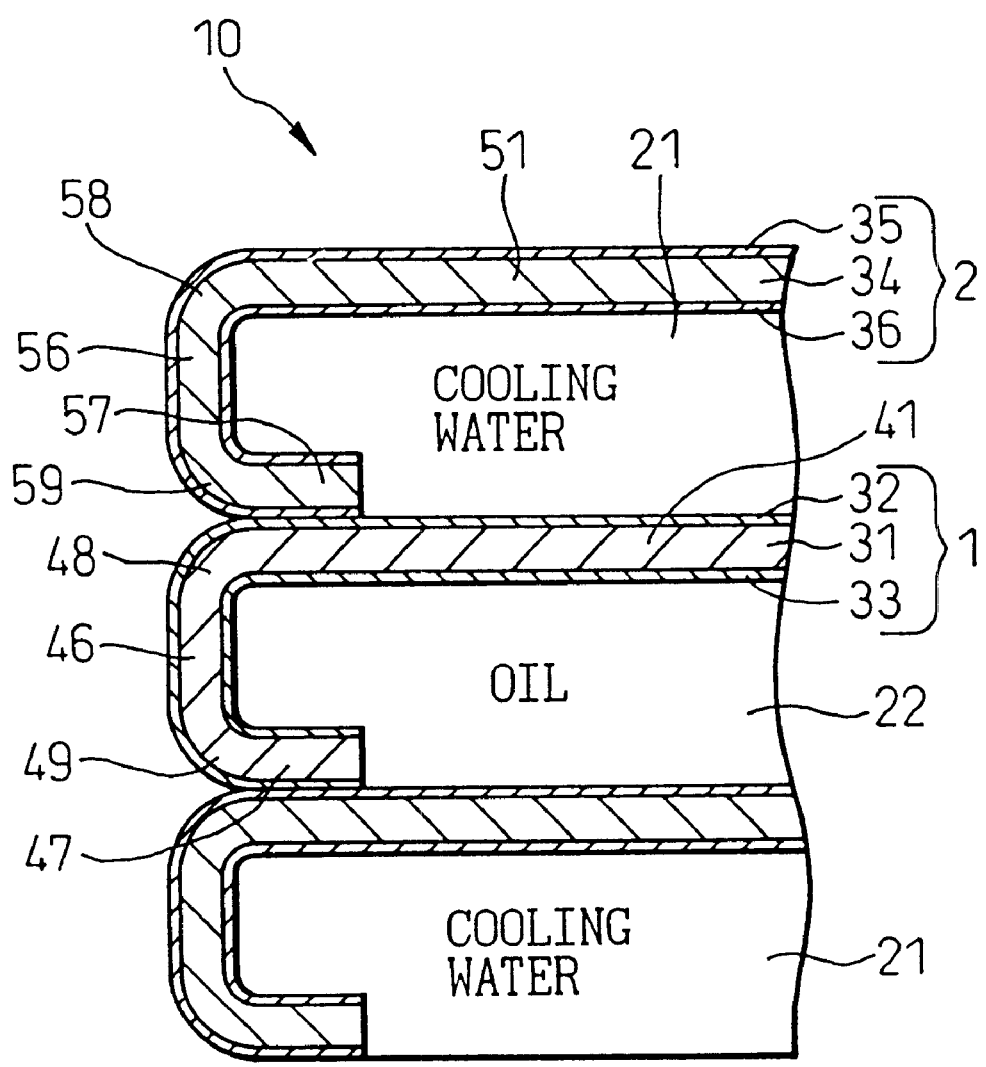
FIG. 11 is a sectional view showing the joint between the outer peripheral portions of the first and second plates yet to be brazed according to a fourth embodiment of the invention.
Figure 12:
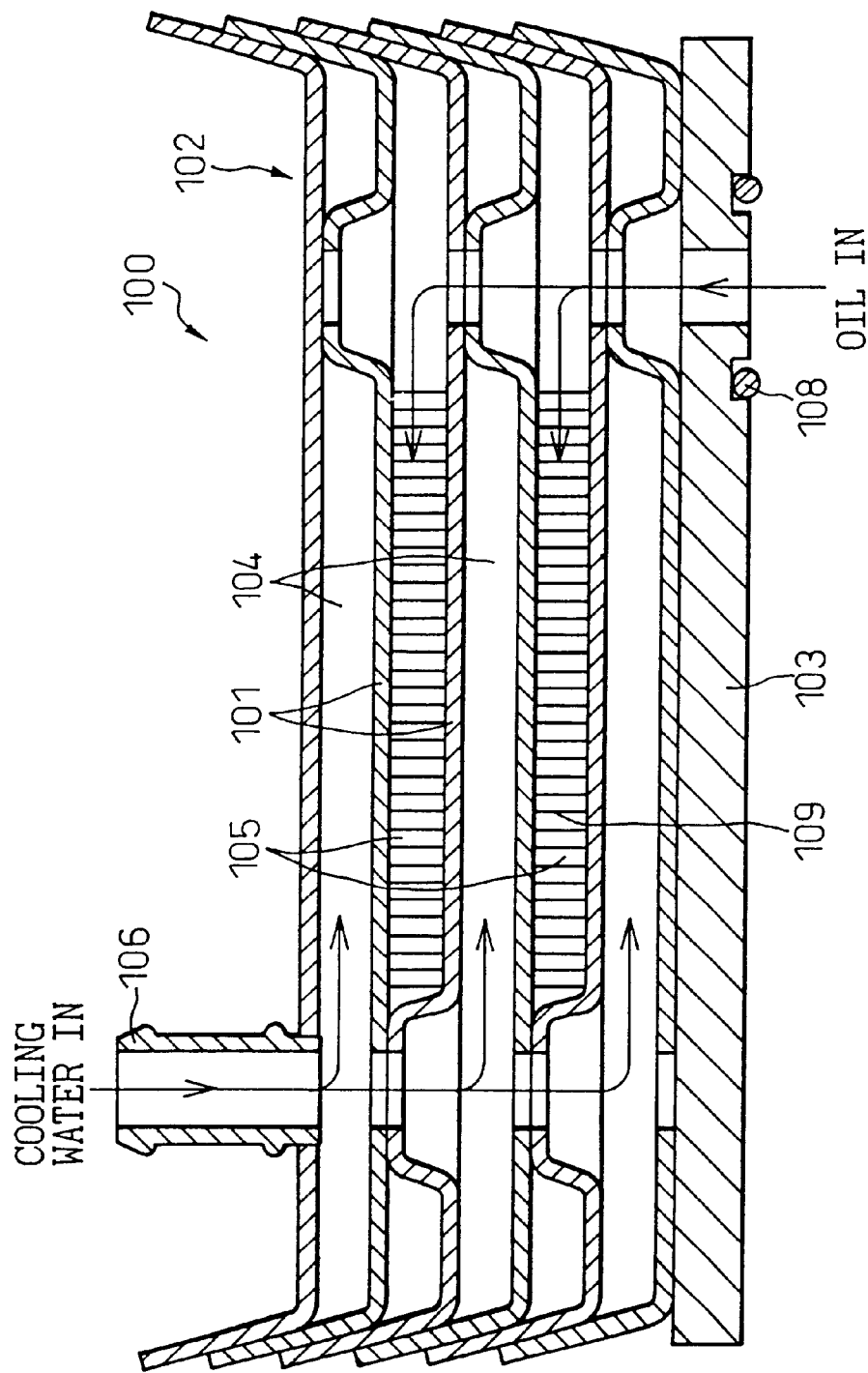
FIG. 12 is a sectional view showing a housingless type oil cooler according to the prior art.
Figure 13:
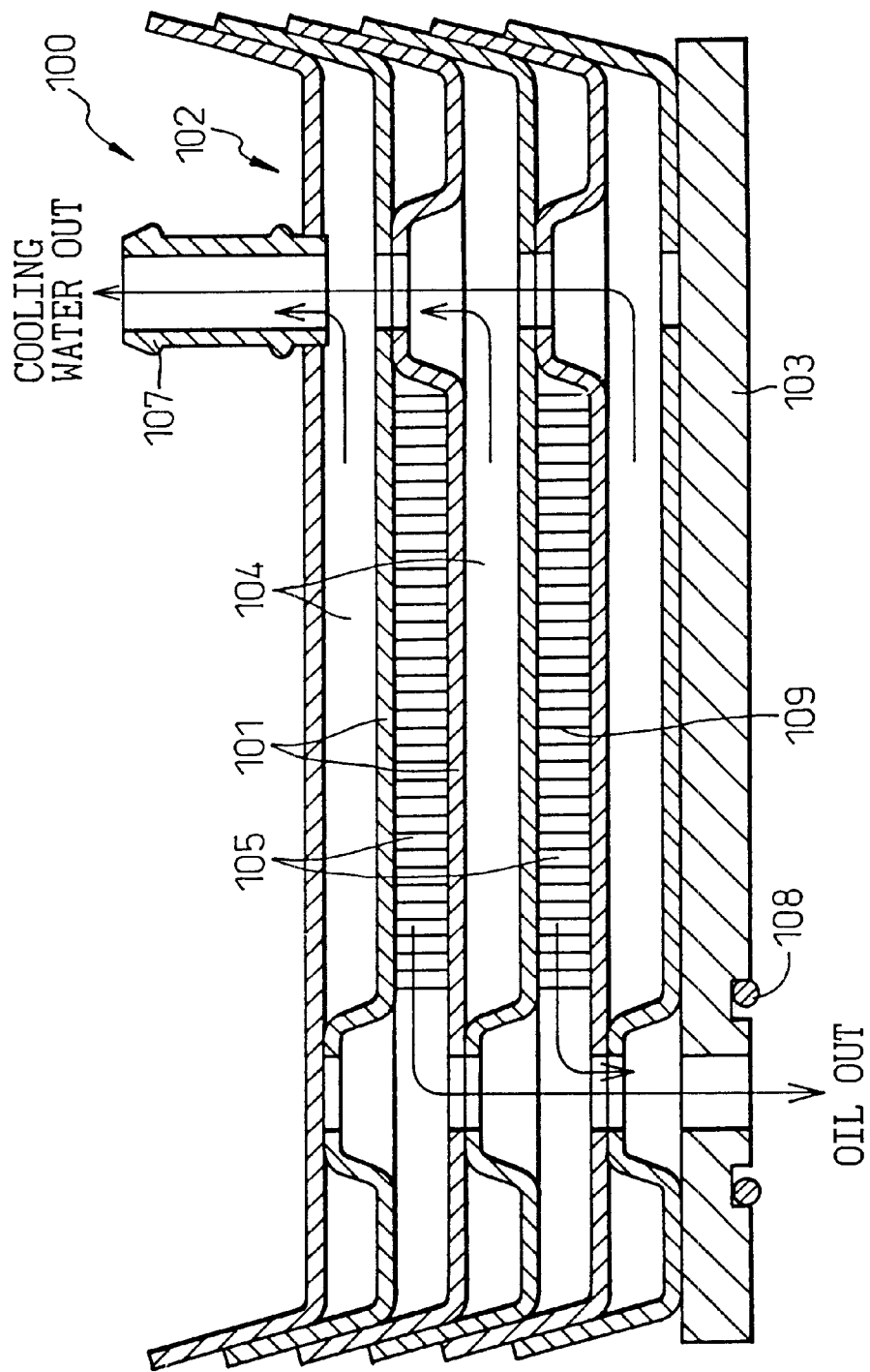
FIG. 13 is a sectional view showing a housingless type oil cooler according to the prior art.

FIG. 11 is a diagram showing the joint of the outer peripheral portions of the first and second plate members yet to be brazed according to a fourth embodiment of the invention.

Unlike in the first embodiment in which the outer peripheral edge portions 47, 57 of the first and second plates (first and second plate members) 1, 2 are bent in such a manner as to be located nearer to the uppermost end than the defining portions 41, 51, respectively, the present embodiment is so configured that the outer peripheral edge portions 47, 57 of the first and second plates (first and second plate members) 1, 2 are bent to be located nearer to the lowermost end than the defining portions 41, 51, respectively. Also in this configuration, the side surfaces of the first and second plates 1, 2 nearer to the cooling water path 21 constitute the first sacrificing material layers 32 side surface and the second sacrificing material layers 36 side surface, respectively. Thus, the corrosion can be effectively prevented.

This embodiment refers to the case in which the housingless type oil cooler is mounted on the wall surface of the cylinder block of an automotive engine. Nevertheless, the housingless type oil cooler may be mounted on the wall surface of the crankcase of the engine or the transmission proper. Further, the present invention is applicable to the plate stack-type core portion of an oil cooler of integrated oil filter type.

According to this embodiment, instead of the engine oil used as an oil (second fluid) flowing in the oil path (second fluid path) 22, other oil such as automatic transmission oil (ATF) or power steering oil may be used as the second fluid flowing in the second fluid path with equal effect.

While the invention has been described by reference to specific embodiments chosen for purposes of illustration, it should be apparent that numerous modifications could be made thereto by those skilled in the art without departing from the basic concept and scope of the invention.

What is claimed is:

1. A heat exchanger made of aluminum, wherein a plurality of first plates of an aluminum-alloy and a plurality of second plates of an aluminum-alloy are stacked alternately in the direction along the thickness thereof and integrally brazed to each other, said heat exchanger comprising:

a plurality of first plate members each having a three-layer structure as said first plates, each of said first plate members including a first core member of an aluminum-alloy, a first sacrificing material layer clad on one end surface of said first core member and having a lower corrosion resistance than said first core member, and a first brazing material layer clad on the other end surface of said first core member and having a lower melting point than said first core member; and a plurality of second plate members having a three-layer structure as said second plates, each of said second plate members including a second core member of an aluminum-alloy, a second brazing material layer clad on one end surface of said second core member and having a lower melting point than said second core member, and a second sacrificing material layer clad on the other end surface of said second core member and having a lower corrosion resistance than said second core member;

said first plate members and said second plate members being arranged alternately with each other in the direction along the thickness thereof in such a manner that said first sacrificing material layer and said second sacrificing material layer are arranged in opposed relation to each other with a first fluid path interposed therebetween, and said brazing material layer and said second brazing material layer are arranged in opposed relation to each other with a second fluid path interposed therebetween;

said first plate members each including a flat defining portion for defining said first fluid path and said second fluid path, a vertical wall portion located nearer to an outer periphery than said defining portion and bent in the direction orthogonal to the direction along the surface of said defining portion, and an outer edge portion bent in the direction along the surface of said defining portion from a forward end of said vertical wall portion, the surface of said outer edge portion being in contact with the joint between first plate member and said second plate member at least through said first brazing material layer, said vertical wall portion having a length longer than the distance between said defining portion and said second plate member.

2. A heat exchanger made of aluminum according to claim 1, wherein the outer peripheral portion of said first plate member is deformed in such a manner as to assume a section substantially in the shape of selected one of U, V and C.

3. A heat exchanger made of aluminum according to claim 1, wherein said second plate member is bent in such a manner as to produce a stepped surface, and includes a defining portion having a stepped surface for defining said first fluid path and said second fluid path, wherein the outer peripheral portion of said second plate member is bent to produce a substantially L-shaped section, and includes an extension portion in the direction along the surface of said defining portion from the outer peripheral end of said defining portion and an outer peripheral edge portion bent in the direction along the thickness orthogonal to the direction along the surface of said extension portion from the outer peripheral end of said extension portion, and wherein a second bent portion engaging a first bent portion formed between said defining portion and said vertical wall portion of said first plate member is arranged between said extension portion and said outer peripheral edge portion.

4. A heat exchanger made of aluminum according to claim 1, wherein the wall of said first fluid path is exposed to a more corrosive environment than the wall of said second fluid path.

5. A heat exchanger made of aluminum according to claim 1, said heat exchanger being a housingless type heat exchanger wherein at least a part of said first plate member forms an outer wall portion.

6. A heat exchanger made of aluminum according to claim 1, wherein said second plate member includes a defining portion for defining said first fluid path and said second fluid path, and an outer peripheral edge portion bent to have a step from the outer peripheral end of said defining portion and extending in the direction along the surface of said defining portion, and wherein the outer peripheral edge portion of said second plate member is coupled with said first plate member at a position nearer to the inner periphery than the outer peripheral edge portion of said first plate member.

* * * * *